United States Patent Office 3,515,773
Patented June 2, 1970

3,515,773
PRESSURE - SENSITIVE ADHESIVES FROM POLY-
URETHANE POLYMERS AND HYDROXYLATED
ELASTOMERS
Rolf Dahl, West Columbia, S.C., assignor to Continental
Tapes, Incorporated, Columbia, S.C., a corporation of
South Carolina
No Drawing. Continuation-in-part of application Ser. No.
512,002, Dec. 6, 1965. This application Sept. 26, 1968,
Ser. No. 762,995
Int. Cl. C08g 41/04, 22/00
U.S. Cl. 260—859
15 Claims

ABSTRACT OF THE DISCLOSURE

This invention discloses pressure-sensitive adhesion in which both internal strength and tackiness are achieved by the use of polyurethane polymers and hydroxylated elastomers, without the use of the usual tackifying resins and plasticizers.

---

This application is a continuation-in-part of my copending application, Ser. No. 512,002, filed Dec. 6, 1965, now Pat. No. 3,437,622 which disclosed pressure-sensitive adhesives in which internal strength is produced by polyurethane polymers and tackiness is produced in the usual manner by the addition of tackifying resins and plasticizers.

I now find I can make useful such adhesives by substituting hydroxylated elastomers for the resins and plasticizers normally used. The following examples will illustrate the methods and products of my present invention. (All proportions given in this application are by weight unless otherwise noted.)

EXAMPLE 1

A prepolymer is made by mixing and heating for 1 hour at 100° C., 200 grams of the addition product of 1-2-6 hexane triol and propylene oxide (molecular weight of the triol adduct 6000, hydroxyl number 28) with 8 grams tolylene diisocyanate (80% 2,4 and 20% 2,6). To 100 parts of the prepolymer are added 5 parts of a liquid, hydroxylated (hydroxyl terminated) styrene-butadiene copolymer (hydroxyl number 42; 60% trans, 20% cis-(1-4), 20/ vinyl(1-2); viscosity 225 poises at 30° C.; density 7.6 lbs./gallon; iodine number 335; 25% styrene, 75% butadiene) and 1 part stannous octoate catalyst. The resulting liquid is spread upon paper (as impregnated by the methods of my copending application, Ser. No. 297,-190, filed July 24, 1963) to yield 7 grams of coating per square foot, and the so-coated paper is heated in an oven at about 250° F. for about 3 minutes. The product is a tacky, pressure-sensitive adhesive with good resistance to heating and high internal strength (cohesiveness).

EXAMPLE 2

A prepolymer is made by mixing and heating as in Example 1, 30 grams of the addition product of dipropylene glycol and propylene oxide (molecular weight of the adduct 2000, hydroxyl number 56), 180 grams of the addition product of 1-2-6 hexane triol and propylene oxide (molecular weight of the adduct 6000, hydroxyl number 28), 30 grams of polypropylene glycol (mol. wt. 2000, hydroxyl number 47) and 17 grams of the tolylene diisocyanate used in Example 1. To 100 parts of the prepolymer are added 5 parts of a liquid, hydroxylated (hydroxyl terminated) polybutadiene (hydroxyl number 45; viscosity 200 poises at 30° C.; density 7.5 lbs. per gallon; iodine number 395; 60% trans, 20% cis (1-4), 20% vinyl (1-2); and 1 part stannous octoate urethane catalyst. The resulting liquid is coated on paper and heated as in Example 1, to yield a similar product.

EXAMPLE 3

A prepolymer is made by mixing and heating at 100° C. for 1 hour, 100 grams of the addition product of dipropylene glycol and propylene oxide (hydroxyl number 265), 1800 grams of the triol addition product of Example 2 and 150 grams of the tolylene diisocyanate of Example 1. To 100 parts of the prepolymer are added 5 parts of a liquid, hydroxylated acrylonitrile-butadiene copolymer (15% acrylonitrile, 85% butadiene; hydroxyl number 39; 60% trans, 20% cis(1-4), 20% vinyl (1-2); viscosity 500 poises at 30° C.; 7.7 lbs./gallon; iodine number 345) and 1 part stannous octoate. After coating and heating as in Example 1, a useful pressure-sensitive adhesive was produced.

My invention is not limited by the above examples. Thus 100 parts of the prepolymer may be mixed with 3 to 10 parts of the hydroxylated polymer or copolymer, although I prefer about 5 parts. The coating weight on the paper or other flexible backing material may vary from 4½ to 7 grams per square foot. In the styrene-butadiene copolymer, the proportion of styrene may vary from 15 to 25%, although I prefer 20%. In the acrylonitrile-butadiene copolymer the proportion of acrylonitrile can vary from 10 to 20%, although I prefer 15%. The hydroxyl numbers of the liquid hydroxylated polymers or copolymers may vary from 20 to 60, although I prefer the hydroxyl numbers of the respective elastomers as shown in the examples. The proportions of trans, cis and vinyl in the elastomers may vary from 57 to 63, 19 to 21 and 19 to 21% respectively. The viscosities and iodine numbers as given in the examples may vary 5% more or less. Although I may dissolve the mixture of prepolymer and hydroxylated elastomer in a suitable solvent such as toluene before coating—this being particularly desirable when a low coating weight is desired—the solvent being removed in the heating in the oven.

The heating of the prepolymer with the hydroxylated elastomer terminates the urethane reactions and appears to give a reinforcing film throughout the adhesive mass to markedly increase the internal strength (cohesiveness) of the mass.

The amount of hydroxylated elastomer can vary from ½ to 1½ the stoichiometric amount needed to provide hydroxyl groups equivalent to the unreacted isocyanate groups left in the prepolymer.

In general the amount of isocyanate from the diisocyanate used to make the prepolymer may vary from about 1.1 to twice the stoichiometric amount required to react with all the hydroxyl groups of the polyols used to make the prepolymer. In general in the prepolymer, all of the hydroxyl groups of the polyol and all of the more reactive isocyanate groups of the polyisocyanate are reacted and a small proportion of the less reactive groups may react. This gives a stable prepolymer whose viscosity does not rapidly increase during processing.

The usual antioxidants and/or fillers may be used in my adhesive so long as they are inert, although my adhesives are usually stable in aging without antioxidant.

Catalysts for the reaction of prepolymers with hydroxylated elastomers, in addition to the stannous octoate shown in the examples, may be other well known urethane catalysts such as, for example, stannous dilaurate, dibutyl tin laurate, lead naphthenate or a tertiary amine. I use an amount of catalyst equal to 1 to 2% of the weight of prepolymer.

In making my prepolymer, I may use di- or polyisocyanates other than tolylene diisocyanate, but I use those like the latter which have isocyanate groups of different reactivity due to the influence of neighboring groups or space relationships in their structure, so that the more reactive groups are used in prepolymer formation. Such are, for example, the di- or polyisocyanates of ethyl benzene, xylene, bitolylene, diphenylxenylene, dichlorxylene, dimethoxy biphenyl, and others.

In prepolymer formation I prefer to use diols of molecular weight 400 to 3000 and hydroxyl numbers from 56 to 265 and triols of molecular weight 3000 to 10,000 and hydroxyl numbers from 28 to 56. I may use such diols and triols either alone or in any mixture with each other. Mixtures of a triol with 10 to 90% diol give superior results. Polyols higher than triols are used mainly as cross-linking agents for the polymers, in amounts not over 10% by weight of the diols and/or triols. The useful polyols include polyhydroxy ethers (substituted or unsubstituted polyalkylene ether glycols or polyhydroxy polyalkylene ethers), polyhydroxy polyesters and the ethylene or propylene oxide adducts of polyols. The latter are preferred because of availability, cost and adaptability to my use.

In making my prepolymers, I prefer to carry the reaction short of the point where the products may become insoluble in toluene.

In place of a single hydroxylated elastomer (polymer or copolymer) I may use mixtures of those I have described.

Having thus described my invention, what I claim is:

1. The method for making a pressure-sensitive adhesive tape which comprises in succession the steps of: (1) mixing a diol of molecular weight from about 400 to about 3000 and of hydroxyl number from about 56 to about 265 with an organic, aromatic polyisocyanate having isocyanate groups of different reactivity, in amount from that containing about 1.1 to about twice the isocyanate equivalent to the hydroxyl groups of the diol; (2) heating the product of step (1) to a temperature and for a time sufficient to react the more reactive isocyanate groups to form a prepolymer soluble in toluene; (3) adding to 100 parts by weight of the product of step (2) 1 to 2 parts by weight of a urethane catalyst and from 3 to 10 parts by weight of a material selected from the class consisting of (a) a hydroxylated polybutadiene polymer of hydroxyl number from 20 to 60, of viscosity from 190 to 210 poises at 30° C., 57 to 63% trans, 19 to 21% cis(1-4) and 19 to 21% vinyl (1-2) (b) a hydroxylated styrene-butadiene copolymer of hydroxyl number from 20 to 60, of viscosity from 214 to 236 poises at 30° C., 57 to 63% trans, 19 to 21% cis(1-4), 19 to 21% vinyl (1-2) and from 15 to 25% styrene (c) a hydroxylated acrylonitrile-butadiene copolymer of hydroxyl number from 20 to 60, of viscosity from 475 to 525 poises at 30° C., 57 to 63% trans, 19 to 21% cis (1-4), 19 to 21% vinyl (1-2) and from 10 to 20% acrylonitrile; (4) coating the product of step (3) upon a flexible, inert backing material and heating the so-coated backing to a temperature and for a time sufficient to substantially completely react the remaining isocyanate groups.

2. The process of claim 1 wherein the said diol of step (1) is replaced by a triol of molecular weight from about 3000 to about 10,000 and of hydroxyl number from about 28 to about 56.

3. The process of claim 1 wherein the said diol of step (1) is replaced by a mixture of said diol with the said triol of claim 2.

4. A pressure-sensitive adhesive tape comprising a flexible, inert backing material coated with a substantially uniform intimate mixture of the following parts: (1) 100 parts by weight of the polyurethane polymer reaction product of a diol of molecular weight from about 400 to about 3000 and hydroxyl number from about 56 to about 265, and an organic, aromatic polyisocyanate containing isocyanate groups of different reactivity, in amount from about that containing 1.1 to about twice the isocyanate groups equivalent to the hydroxyl groups of said diol; with from 3 to 10 parts by weight of a material selected from the class consisting of (a) a hydroxylated polybutadiene polymer of hydroxyl number from 20 to 60, of viscosity from 190 to 210 poises at 30° C., 57 to 63% trans, 19 to 21% cis(1-4), 19 to 21% vinyl (1-2) (b) a hydroxylated styrene-butadiene copolymer of hydroxyl number from 20 to 60, of viscosity from 214 to 235 poises at 30° C., 57 to 63% trans, 19 to 21% cis (1-4), 19 to 21% vinyl (1-2) and from 15 to 25% styrene (c) a hydroxylated acrylonitrile-butadiene copolymer of hydroxyl number from 20 to 60, of viscosity from 475 to 525 poises at 30° C., 57 to 63% trans, 19 to 21% cis(1-4), 19 to 21% vinyl (1-2) and from 10 to 20% acrylonitrile; and (2) a urethane catalyst in amount from about 1 to about 2% by weight of the said polyurethane polymer.

5. The product of claim 4 wherein the said diol of step (1) is replaced by a triol of molecular weight from about 3000 to about 10,000 and of hydroxyl number from about 28 to about 56.

6. The product of claim 4 wherein the said diol of step (1) is replaced by a mixture of said diol with the said triol of claim 5.

7. The process of claim 1 wherein the material of step (3)(a) has a hydroxyl number of 45, the material of step (3)(b) has a hydroxyl number of 42 and the material of step (3)(c) has a hydroxyl number of 39.

8. The product of claim 4 wherein the said urethane catalyst of step (2) is stannous octoate.

9. The process of claim 1 wherein the said polyisocyanate of step (1) is tolylene diisocyanate.

10. The product of claim 4 wherein the said polyisocyanate of step (1) is tolylene diisocyanate.

11. The process claim 1 wherein the said heating of step (2) is at about 100° C. for about 1 hour.

12. The process of claim 2 wherein the said polyisocyanate of step (1) is tolylene diisocyanate.

13. The process of claim 3 wherein the said polyisocyanate of step (1) is tolyene diisocyanate.

14. The product of claim 5 wherein the said polyisocyanate of step (1) is tolylene diisocyanate.

15. The product of claim 6 wherein the said polyisocyanate of step (1) is tolylene diisocyanate.

References Cited

UNITED STATES PATENTS

| | | | |
|---|---|---|---|
| 2,877,212 | 3/1959 | Seligman | 260—859 |
| 2,948,707 | 8/1960 | Benning | 260—859 |
| 3,404,130 | 10/1968 | Sigura | 260—859 |
| 3,427,366 | 2/1969 | Verdol | 260—859 |
| 3,440,292 | 4/1969 | Allen | 260—77.5 |

OTHER REFERENCES

Product Data Bulletin No. 505, issued May 1, 1965, Sinclair Research.

PAUL LIEBERMAN, Primary Examiner

U.S. Cl. X.R.

260—77.5

UNITED STATES PATENT OFFICE
CERTIFICATE OF CORRECTION

Patent No. 3,515,773                          June 2, 1970

Rolf Dahl

It is certified that error appears in the above identified patent and that said Letters Patent are hereby corrected as shown below:

Column 1, line 16, "adhesion" should read -- adhesives --; line 45, "20/" should read -- 20% --. Column 2, line 32, "Although" should read -- Also --.

Signed and sealed this 12th day of January 1971.

(SEAL)
Attest:

Edward M. Fletcher, Jr.

Attesting Officer

WILLIAM E. SCHUYLER, JR.

Commissioner of Patents